United States Patent
Furushige et al.

(10) Patent No.: US 9,483,102 B2
(45) Date of Patent: Nov. 1, 2016

(54) PERIPHERAL APPARATUS, TERMINAL, POWER SAVING CONTROL SYSTEM, POWER SAVING CONTROL METHOD, AND POWER SAVING CONTROL PROGRAM

(71) Applicant: KYOCERA Document Solutions Inc., Osaka (JP)

(72) Inventors: Katsuji Furushige, Osaka (JP); Masaya Okuda, Osaka (JP); Masato Hirota, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 156 days.

(21) Appl. No.: 14/555,284

(22) Filed: Nov. 26, 2014

(65) Prior Publication Data
US 2015/0153806 A1 Jun. 4, 2015

(30) Foreign Application Priority Data
Nov. 29, 2013 (JP) .................................. 2013-248551

(51) Int. Cl.
G06F 1/00 (2006.01)
G06F 1/32 (2006.01)
G06F 3/12 (2006.01)

(52) U.S. Cl.
CPC ............ *G06F 1/325* (2013.01); *G06F 1/3284* (2013.01); *G06F 1/3203* (2013.01); *G06F 3/1292* (2013.01); *Y02B 60/1267* (2013.01); *Y02B 60/32* (2013.01)

(58) Field of Classification Search
CPC .... G06F 1/325; G06F 1/3203; G06F 1/3284; G06F 3/1292

USPC .......................................... 713/300, 320, 323
See application file for complete search history.

(56) References Cited

U.S. PATENT DOCUMENTS

2004/0057069 A1* 3/2004 Ikeda ..................... G06F 1/3203
358/1.14

FOREIGN PATENT DOCUMENTS

JP 2004-1241 A 1/2004
JP 2006-221427 A 8/2006
(Continued)

OTHER PUBLICATIONS

Japanese Office Action dated Mar. 8, 2016, issued by the Japanese Patent Office in corresponding application JP 2013-248551.
(Continued)

*Primary Examiner* — Michael J Brown
(74) *Attorney, Agent, or Firm* — Stein IP, LLC

(57) ABSTRACT

A peripheral apparatus comprises: a power saving state shift notification signal transmission unit that transmits a power saving state shift notification signal to the terminal at a time of shifting to a power saving state; a notification response signal reception unit that receives a notification response signal from the terminal that is set as an output target for image forming and responds, only while in an operation state, to the power saving state shift notification signal transmitted from the power saving state shift notification signal transmission unit; and a power saving state shift control unit that stops a shift to the power saving state in a case of receiving the notification response signal by means of the notification response signal reception unit and executes the shift to the power saving state in a case of not-receiving the notification response signal.

16 Claims, 6 Drawing Sheets

(56) References Cited

FOREIGN PATENT DOCUMENTS

| | | |
|---|---|---|
| JP | 2012-83825 A | 4/2012 |
| JP | 2013-188971 A | 9/2013 |

OTHER PUBLICATIONS

Japanese Office Action issued by the Japanese Patent Office dated Jun. 10, 2016, in corresponding application 2013-248551.

* cited by examiner

PERIPHERAL APPARATUS, TERMINAL, POWER SAVING CONTROL SYSTEM, POWER SAVING CONTROL METHOD, AND POWER SAVING CONTROL PROGRAM

INCORPORATION BY REFERENCE

The present application claims the benefit of priority to Japanese Patent Application No. 2013-248551 filed on Nov. 29, 2013, the contents of which are hereby incorporated by reference.

BACKGROUND OF THE INVENTION

The present disclosure relates to a peripheral apparatus, a terminal, a power saving control system, a power saving control method, and a power saving control program that perform a notification response about a shift to a power saving state.

As a typical peripheral apparatus that can perform a shift to a power saving state, there is an image forming apparatus of a multi-functional machine (Multifunctional Peripheral, MFP) that can print a document and an image.

Besides, in a typical image processing system, a PC (Personal Computer) includes a program for determining a power saving state, and in a case where the program determines the power saving state, notifies an image processing apparatus of a shift to the power saving state. The image processing apparatus of the typical image processing system shifts to the power saving state when being notified, by the PC, of the shift to the power saving state.

SUMMARY OF THE INVENTION

A peripheral apparatus according to an aspect of the present disclosure is a peripheral apparatus that is connectable to a terminal over a network, and includes a power saving state shift notification signal transmission unit, a notification response signal reception unit, and a power saving state shift control unit. The power saving state shift notification signal transmission unit transmits a power saving state shift notification signal to the terminal at a time of shifting to a power saving state; the notification response signal reception unit receives a notification response signal from a terminal that is set as an output target for image forming and responds, only while in an operation state, to the power saving state shift notification signal transmitted from the power saving state shift notification signal transmission unit; and the power saving state shift control unit stops the shift to the power saving state in a situation of receiving the notification response signal from the notification response signal reception unit, and executes the shift to the power saving state in a situation of not-receiving the notification response signal.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

<Embodiment>

[Whole Structure of Image Forming System X]

Figure 1:
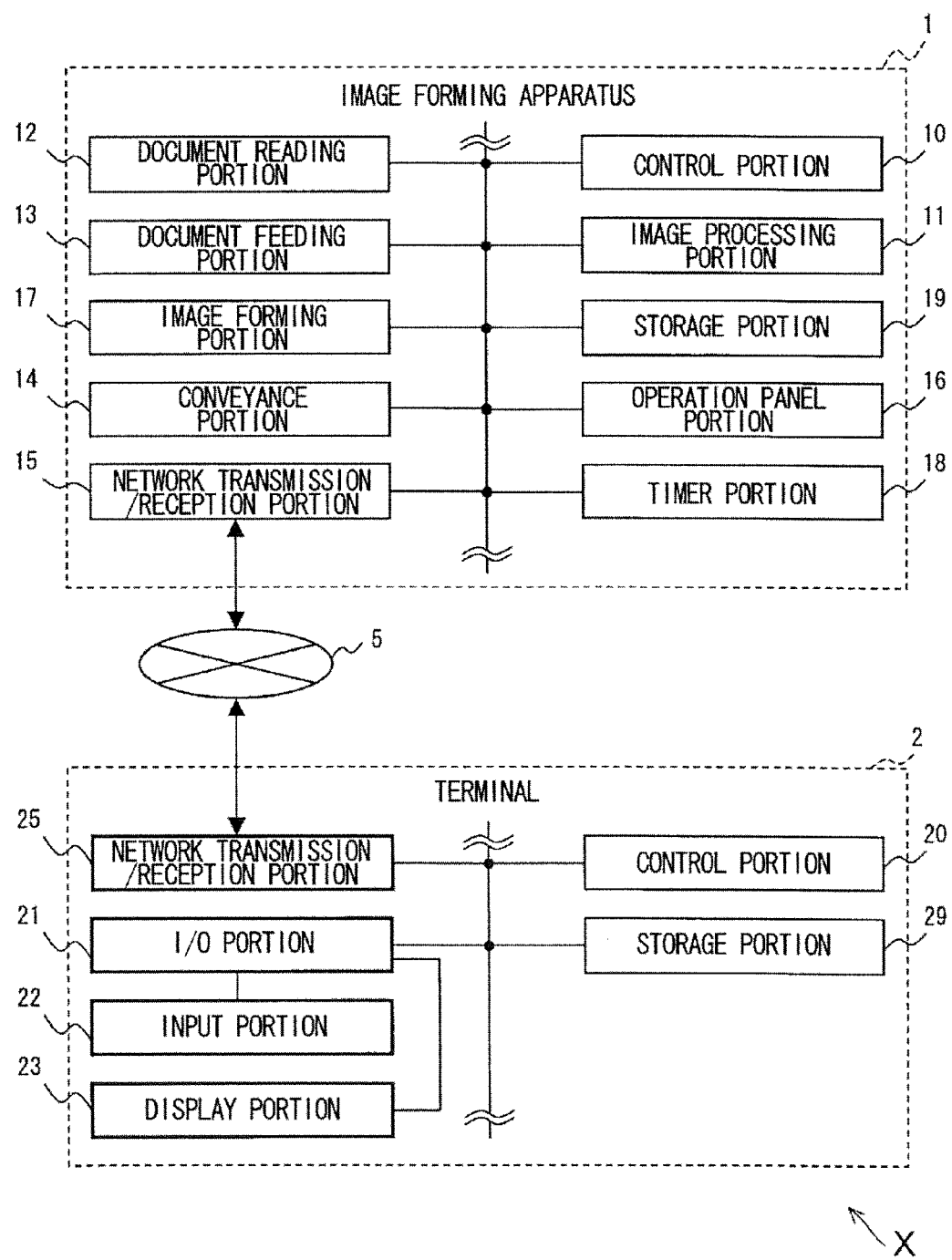
FIG. 1 shows a whole structure of an image forming system according to a present embodiment.

With reference to FIG. 1, a whole structure of the image forming system X according to the present embodiment is described. An image forming apparatus 1 is an image forming apparatus as a peripheral apparatus such as a MFP or the like that prepares a document. A terminal 2 is a terminal like a PC such as a PC/AT compatible machine or the like, a mobile phone, a smart phone, a tablet terminal or the like that is used to browse documents. The image forming apparatus 1 and the terminal 2 are connected to a network 5 such as a LAN, a wireless LAN, a WAN, a mobile phone network or the like.

(Whole Structure of Image Forming Apparatus 1)

In the image forming apparatus 1, an image processing portion 11, a document reading portion 12, a document feeding portion 13, a conveyance portion 14, a network transmission/reception portion 15, an operation panel portion 16, an image forming portion 17, a timer portion 18 (time measuring unit), a storage portion 19 and the like are connected to a control portion 10. Each portion is controlled by the control portion 10 to operate.

The control portion 10 is an information processing unit such as a GPP (General Purpose Processor), a CPU (Central Processing Unit), a MPU (Micro Processing Unit), DSP (Digital Signal Processor), a GPU (Graphics Processing Unit), an ASIC (Application Specific Processor) or the like. The control portion 10 reads out a control program stored in a ROM and a HDD of the storage portion 19, deploys the program in a RAM and executes the program, thereby operating as each unit of a function block that is described later. Besides, the control portion 10 controls the entire apparatus based on command information input from a external terminal and the operation panel portion 16.

The image processing portion 11 is a control calculation unit such as a DSP (Digital Signal Processor), a GPU (Graphics Processing Unit) or the like. The image processing portion 11 is a unit that applies an image process to image data, and for example, performs various image processes such as enlargement/reduction, concentration adjustment, gradation adjustment, image improvement and the like. The image processing portion 11 stores, into the storage portion 19, an image read by the document reading portion 12 as print data. Here, the image processing portion 11 can also convert the print data into a file unit with a format of PDF, TIFF or the like.

The document reading portion 12 is a (scan) device that reads a set document. The document feeding portion 13 is a device that conveys the document read by the document reading portion 12. The image forming portion 17 is a device that performs, based on an output command from a user, image forming on a recording paper sheet based on data that is stored in the storage portion 19, read by the document reading portion 12, or obtained from an external terminal. The conveyance portion 14 conveys a recording paper sheet, the image forming portion 17 forms an image, and the paper sheet is ejected.

The network transmission/reception portion 15 is a communication device that includes a LAN board, a wireless transmission/reception apparatus and the like that connect to external networks such as a LAN, a wireless LAN, a WAN, a mobile telephone network and the like. The network transmission/reception portion 15 transmits/receives data over a data communication line, and transmits/receives a voice signal over a voice telephone line.

The operation panel portion 16 includes a display portion such as an LCD or the like, a ten-key pad, a switchover button for switching operation modes such as a start, cancel, duplication, FAX transmission, scan and the like, a button for performing a command relevant to execution of jobs of print, transmission, storage and the like of a selected document, and an input portion such as a touch panel and the like. The operation panel portion 16 obtains commands from the user for various jobs of the image forming apparatus 1. Besides, it is also possible to input and change information of each user based on user commands obtained from the operation panel portion 16.

The timer portion 18 includes a real time clock, a GPS (Global Positioning System) receiver, an NTP client and the like. Besides, the timer portion 18 includes a plurality of timers that measure elapses of a plurality of periods set for respective monitoring items. When the set period elapses, the timer portion 18 generates, for example, an interruption or the like to notify the control portion 10. These timers each can set the period to be measured, start/stop time measurement (count), and initialize (reset) the count. The timer portion 18 can obtain time information of actual time that has a small error. Besides, in the situation where the timer portion 18 includes the GPS receiver, it is also possible to obtain positional information of the image forming apparatus 1.

The storage portion 19 is a device that uses semiconductor memories such as a ROM (Read Only Memory), a RAM (Random Access Memory) and the like and recording mediums such as a HDD (Hard Disk Drive) and the like. The RAM of the storage portion 19 holds stored content by means of functions such as a self-refresh and the like even in the power saving state. The ROM and HDD of the storage 19 store the control program for performing the operation control of the image forming apparatus 1. In addition to this, the storage portion 19 stores account setting of the user as well. Besides, the storage portion 19 may include a storage holder region for each user.

In the meantime, in the image forming apparatus 1, the control portion 10 and the image processing portion 11 may be integrally formed like a CPU incorporated in the GPU and a chip-on module package. Besides, the control portion 10 and the image processing portion 11 may incorporate a RAM, a ROM, a flash memory and the like. Besides, the image forming apparatus 1 may include a FAX transmission/reception portion that performs facsimile transmission/reception.

(Whole Structure of Terminal 2)

The terminal 2 includes a control portion 20, an I/O portion 21, an input portion 22, a display portion 23, a network transmission/reception portion 25, a storage portion 29 (image forming output setting information storage unit). Each portion is controlled by the control portion 20 to operate.

The control portion 20 is a device that includes a calculation/control capability such as a CPU (Central Processing Unit), a MPU (Micro Processing Unit), a DSP (Digital Signal Processor), a GPU (Graphics Processing Unit), an ASIC (Application Specific Processor) or the like. The control portion 20 executes each program stored in the storage portion 29 by using a hardware resource.

The I/O portion 21 is a constituent part that provides interfaces for a DVI, an analog RGB, a HDMI (registered trademark), a USB, an IEEE1394, serial transmission, parallel transmission, infrared transmission, wireless transmission and the like for connecting to various peripheral apparatuses (peripherals). The I/O portion 21 is connected to the input portion 22 and the display portion 23.

The input portion 22 is a device such as a key board, a mouse, a touch panel, a touch pad and the like for inputting information of various settings, user authentication and the like.

The display portion 23 is a device such as a LCD display, an organic EL display or the like. The display portion 23 can display various setting screens of an OS (Operating System), drawing screens of application software and the like.

The network transmission/reception portion 25 is a LAN interface, a wireless LAN interface, a mobile electric wave transmission/reception device or the like that are in conformity with 1000BASE-T/1000BASE-TX standards or the like, for example. The terminal 2 can transmit/receive a power saving state shift notification signal 300 (FIG. 2), a notification response signal 400, document data, a user ID and password and the like at a log-in time via the network transmission/reception portion 25. In the meantime, the network transmission/reception portion 25 is connected to an external hub, a router and the like, and may be connected to the network 5.

The storage portion 29 is a storage device that includes: a main storage device such as a RAM (Random Access Memory) or the like; a flash memory disk such as a SSD (Solid State Drive) or the like; and auxiliary storage devices such as a HDD (Hard Disk Drive), a magnetic tape apparatus, an optical disk apparatus or the like. The storage portion 29 stores: various programs that make the terminal 2 function as a terminal for browsing documents; and document data for browsing. Details of these programs and data are described later.

Besides, the storage portion 29 also stores an OS (Operating System) that includes a GUI (Graphical User Interface); application software such as a word processor, table calculation software, drawing software, a WWW browser, an electronic mailer and the like; and other programs, data and the like. The control portion 20 can read these programs and data, execute and write them. In other words, the storage portion 29 can also store temporarily the print data prepared by the control portion 20. The terminal 2 can also transmit the print data to the image forming apparatus 1.

[System Structure of Image Forming System X]

Figure 2:
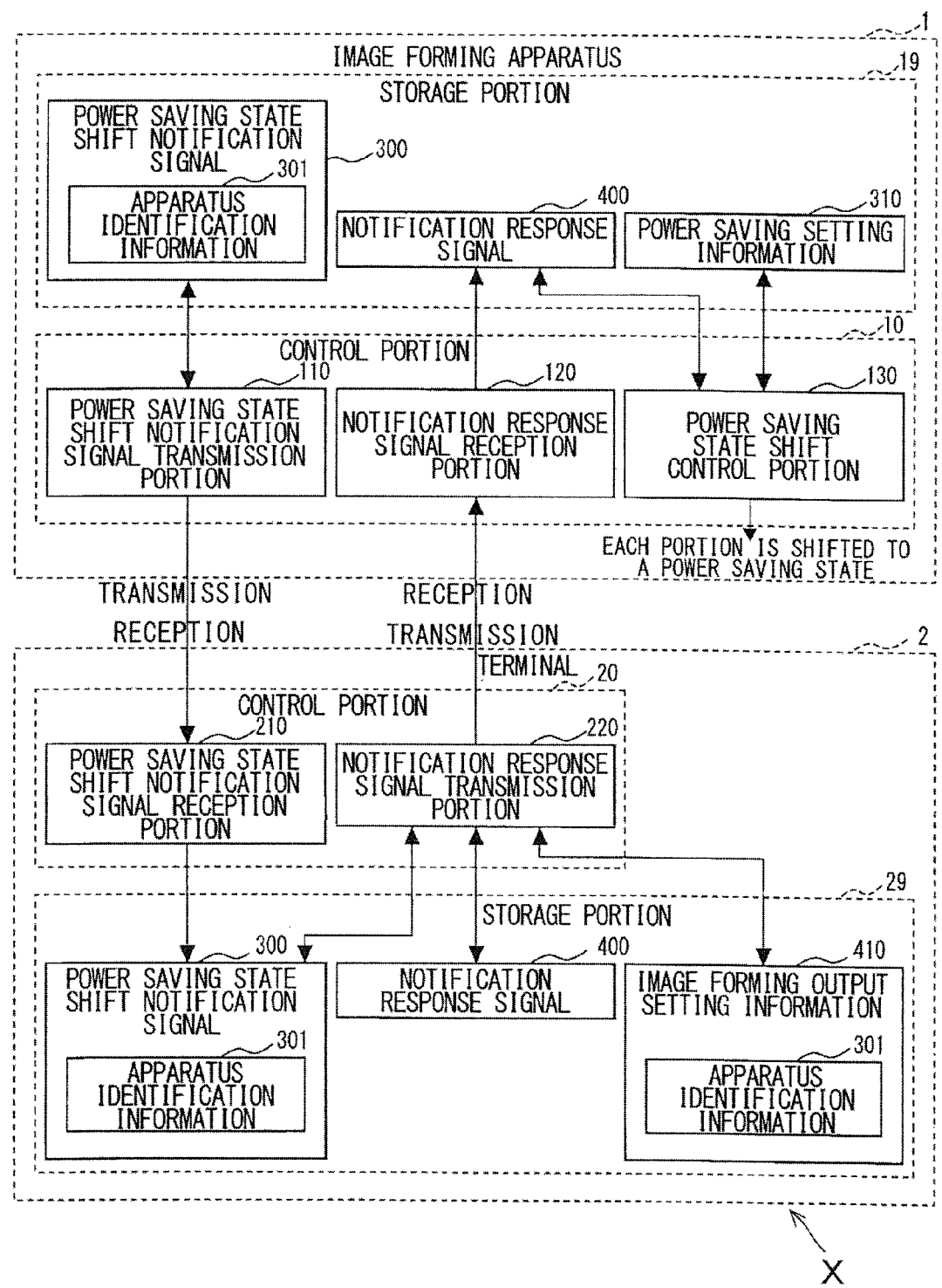
FIG. 2 shows a structure of the image forming system shown in FIG. 1.

With reference to FIG. 2, a system structure of the image forming system X that includes the image forming apparatus 1 and the terminal 2 is described. The image forming apparatus 1 includes a power saving state shift notification signal transmission portion 110, a notification response signal reception portion 120, and a power saving state shift control portion 130. The storage portion 19 of the image forming apparatus 1 stores a power saving state shift notification signal 300, a notification response signal 400, and a power saving setting information 310. The terminal 2 includes a power saving state shift notification signal reception portion 210 and a notification response signal transmission portion 220. The storage portion 29 of the terminal 2 stores the power saving state shift notification signal 300, the notification response signal 400, and image forming output setting information 410.

The power saving state shift notification signal transmission portion 110 transmits the power saving state shift notification signal 300 to the terminal 2 at a time of shifting to the power saving state. At this time, the power saving state shift notification signal transmission portion 110 can transmit the power saving state shift notification signal 300 to the terminal 2 by means of a broadcast method. Besides, in a situation where a count of a power saving notification timer set in the timer portion 18 reaches a specific value and there is not a user operation on the operation panel portion 16 nor an output from the image forming portion 17, the power saving state shift notification signal transmission portion 110 performs a process to shift to the power saving state.

The notification response signal reception portion 120 receives the notification response signal 400 from the terminal 2 that is set as an output target for image forming and responds, only while in an operation state, to the power saving state shift notification signal 300 transmitted from the power saving state shift notification signal transmission portion 110.

When receiving the notification response signal 400 by means of the notification response signal reception portion 120, the power saving state shift control portion 130 stops the shift to the power saving state, and in a situation of not-receiving the notification response signal 400, executes the shift to the power saving state. When going to a state set in the power saving setting information 310 stored in the storage portion 19, the power saving state shift control portion 130 shifts to the power saving state even in a situation of receiving the notification response signal 400.

The power saving state shift notification signal reception portion 210 receives the power saving state shift notification signal 300 that is transmitted at the time of shifting to the power saving state of the image forming apparatus.

The notification response signal transmission portion 220 transmits the notification response signal 400 to respond to the image forming apparatus only when the power saving state shift notification signal 300 received by the power saving state shift notification signal reception portion 210 is transmitted from the image forming apparatus that is set as an output target for image forming.

The power saving state shift notification signal 300 is a signal that is transmitted to the terminal 2 via the network 5 at the time of shifting to the power saving state. The power saving state shift notification signal 300 can use information under a unique protocol via specific ports of TCP/IP, for example. Besides, the power saving state shift notification signal 300 contains apparatus identification information 301. The apparatus identification information 301 is information such as the apparatus specific ID, production number, IP address of the image forming apparatus 1, an apparatus specific name, a host name and the like that are set by a supervisor.

The power saving setting information 310 is setting information of a specific (default) condition and the like for shifting to the power saving state and setting information of the shift to the power saving state including the user setting. The power saving setting information 310 includes, for example, a period located before the power saving state shift notification signal 300 is transmitted; a period for awaiting the response of the notification response signal 400 after the power saving state shift notification signal 300 is transmitted; a transition period located before shifting to the power saving state in a situation where there is not an operation and the like by the user; a setting time for automatically shifting to the power saving state by means of a working time, a date, a time and the like; and setting information of permission of the shift to the power saving state by means of pushing-down of a power button or the like that is a sub-power source switch of the operation panel portion 16 and permission of return from the power saving state.

The notification response signal 400 is a signal to respond to the image forming apparatus 1 in reply to the power saving state shift notification signal 300. As to the notification response signal 400, for example, it is possible to use a response signal under a unique protocol via the specific ports of TCP/IP for the power saving state shift notification signal 300.

The image forming output setting information 410 is information of the image forming apparatus 1 that is set an output target for image forming. The image forming output setting information 410 includes, for example, information of whether or not a device driver of the image forming apparatus 1 is installed for the output targets for image forming; and information of whether or not it is possible to set the application software and OS for the output targets for image forming. Besides, the image forming output setting information 410 contains the apparatus identification information 301 of the image forming apparatus 1 as the setting information of an output target for image forming.

Here, the control portion 10 of the image forming apparatus 1 executes the control program stored in the storage portion 19, thereby functioning as the power saving state shift notification signal transmission portion 110, the notification response signal reception portion 120, and the power saving state shift control portion 130. Besides, the control portion 20 of the terminal 2 executes the control program stored in the storage portion 29, thereby functioning as the power saving state shift notification signal reception portion 210 and the notification response signal transmission portion 220. Besides, the respective portions of the image forming apparatus 1 and terminal 2 serve as hardware resources for executing an image forming method according to the present disclosure.

[Power Saving State Shift Process by Image Forming Apparatus 1]

Figure 3:
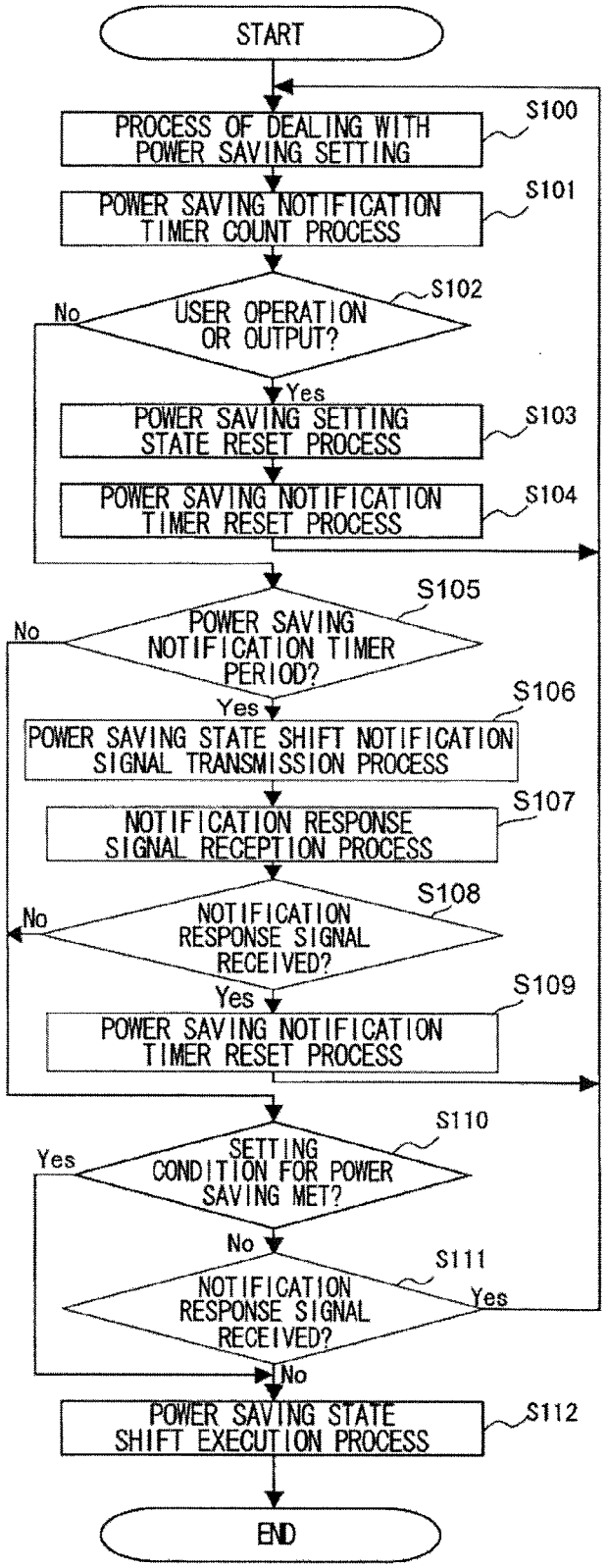
FIG. 3 shows steps of a power saving state shift process according to the present embodiment.

Next, with reference to FIG. 3, a power saving state shift process by the image forming apparatus 1 according to the present embodiment is described. In the power saving state shift process according to the present embodiment, the power saving state shift notification signal 300 is transmitted from the image forming apparatus 1 to the terminal 2 via the network 5. Here, as described later, the terminal 2 is in the operation state and transmits the notification response signal 400 in reply to the power saving state shift notification signal 300 only when the image forming apparatus 1 is set as an output target for image forming and the like. When receiving the notification response signal 400, the image forming apparatus 1 stops the shift to the power saving state, and in a situation of not-receiving it, executes the shift to the power saving state. In the power saving state shift process, mainly the control portion 10 shares the program stored in the storage portion 19 with each portion to execute the program by using the hardware resources. Hereinafter, with reference to a flow chart of FIG. 3, details of the power saving state shift process are described step by step.

(Step S100)

First, the control portion 10 performs a process for dealing with power saving setting by means of the power saving state shift control portion 130 and the power saving state shift notification signal transmission portion 110. The control portion 10 reads the power saving setting information 310 out of the storage portion 19, sets, into the timer portion 18, a transition period located before the shift to the power saving state in a situation where there is not a user operation and the like, and makes the timer portion count time. Hereinafter, the timer in which the transition period is set is called a "power saving shift timer." Besides, the control portion 10 sets a period located before transmission of a power saving shift notification signal. Hereinafter, the timer in which the period or the like located before the transmission of the power saving shift notification signal is set is called a "power saving notification timer."

(Step S101)

Next, the control portion 10 performs a power saving notification timer count process by means of the power saving state shift notification signal transmission portion 110. The control portion 10 makes the power saving notification timer start counting.

(Step S102)

Next, by means of the power saving state shift control portion 130 and the power saving state shift notification signal transmission portion 110, the control portion 10 determines whether or not there is a user operation or an output. The control portion 10 determines "Yes" if there is a user operation on the operation panel portion 16, transmission of document data from the terminal 2, an output from the image forming portion 17 or the like. The control portion 10 determines "No" in a situation other than this. If "Yes", the control portion 10 advances the process to a step S103. If "No", the control portion 10 advances the process to a step S105.

(Step S103)

If there is a user operation or an output, the control portion 10 performs a power saving setting state reset process by means of the power saving state shift control portion 130 and the power saving state shift notification signal transmission portion 110. The control portion 10 resets the power saving shift timer to make the timer restart the counting.

(Step S104)

Next, the control portion 10 performs a power saving notification timer reset process by means of the power saving state shift notification signal transmission portion 110. The control portion 10 resets the power saving notification timer to make the timer restart the counting. In this way, the shift to the power saving state is temporarily stopped. Thereafter, the control portion 10 returns the process to the step S100 and continues the counting of each timer.

(Step S105)

If there is not a user operation nor an output, the control portion 10 determines by means of the power saving state shift notification signal transmission portion 110 whether the period set in the power saving notification timer elapses or not. The control portion 10 determines "Yes" if the period set in the power saving notification timer elapses. The control portion 10 determines "No" in a situation other than this. If "Yes", the control portion 10 advances the process to a step S106. If "No", the control portion 10 advances the process to a step S110.

(Step S106)

If the period set in the power saving notification timer elapses, the control portion 10 performs a power saving state shift notification signal transmission process by means of the power saving state shift notification signal transmission portion 110. The control portion 10 transmits the power saving state shift notification signal 300 to each terminal 2 connected to the network 5. At this time, the control portion 10 may perform the transmission by means of a broadcast method or the like. Thereafter, the control portion 10 transmits the power saving state shift notification signal 300 to the timer portion 18, thereafter, sets a period for awaiting the response of the notification response signal 400, and awaits a response from the terminal 2. Hereinafter, the timer for setting the period relevant to the response is called a "response signal awaiting timer."

(Step S107)

Next, the control portion 10 performs a notification response signal reception process by means of the notification response signal reception portion 120. The control portion 10 awaits reception of the notification response signal 400 from the terminal 2 until the period set in the response signal awaiting timer elapses.

(Step S108)

Next, the control portion 10 determines by means of the notification response signal reception portion 120 whether the notification response signal 400 is received or not. The control portion 10 determines "Yes" if the notification response signal 400 is received from any one of the terminals 2. The control portion 10 determines "No" in a situation other than this, namely, if the notification response signal 400 cannot be received from the terminal 2 even when the period for awaiting the response of the notification response signal 400 elapses. If "Yes", the control portion 10 advances the process to a step S109. If "No", the control portion 10 advances the process to the step S110.

(Step S109)

If the notification response signal 400 is received, the control portion 10 performs the power saving notification timer reset process by means of the power saving state shift control portion 130. Like in the step S104, the control portion 10 stops the shift to the power saving state, resets the power saving notification timer to make the timer restart the counting. Thereafter, the control portion 10 returns the process to the step S100 and continues the counting of each timer.

(Step S110)

Here, the control portion 10 determines by means of the power saving state shift control portion 130 whether a setting condition for the power saving is met or not. The control portion 10 reads the power saving setting information 310 and determines "Yes" if a state matching with the setting condition for shifting to the power saving state is obtained. For example, the control portion 10 determines "Yes" if the period set in the power saving shift timer elapses, when the setting time for automatically shifting to the power saving state comes, or when pushing-down of the power button or the like is detected in a situation where the shift to the power saving state is permitted by pushing down the power button or the like. The control portion 10 determines "No" in a situation other than these. If "Yes", the control portion 10 advances the process to a step S112. If "No", the control portion 10 advances the process to a step S111.

(Step S111)

If the setting condition for the power saving is not met, the control portion 10 determines again by means of the power saving state shift control portion 130 whether the notification response signal 400 is received or not. The control portion 10 determines "No" If the control portion 10 transmits the power saving state shift notification signal 300 but does not receive the notification response signal 400. The control portion 10 determines "Yes" in a situation other than this, namely, a situation where the period set in the power saving notification timer 400 has not elapsed yet after the power saving notification timer is reset (step S109) in response to reception of the notification response signal 400 and the counting is restarted. If "Yes", the control portion 10 returns the process to the step S100 to continue the counting by means of the power saving notification timer. If "No", the control portion 10 advances the process to a step S112.

(Step S112)

Here, the control portion 10 performs a power saving state shift execution process by means of the power saving state shift control portion 130. The control portion 10 performs the shift of each portion to the power saving state. For example, the control portion 10 turns off power sources of the image forming portion 17, display portion and the like of the operation panel portion 16, and shifts itself to a low power consumption state such as sleep and the like. With this the power saving state shift process according to the present embodiment is ended.

[Power Saving Shift Notification Response Process by Terminal 2]

Figure 4:
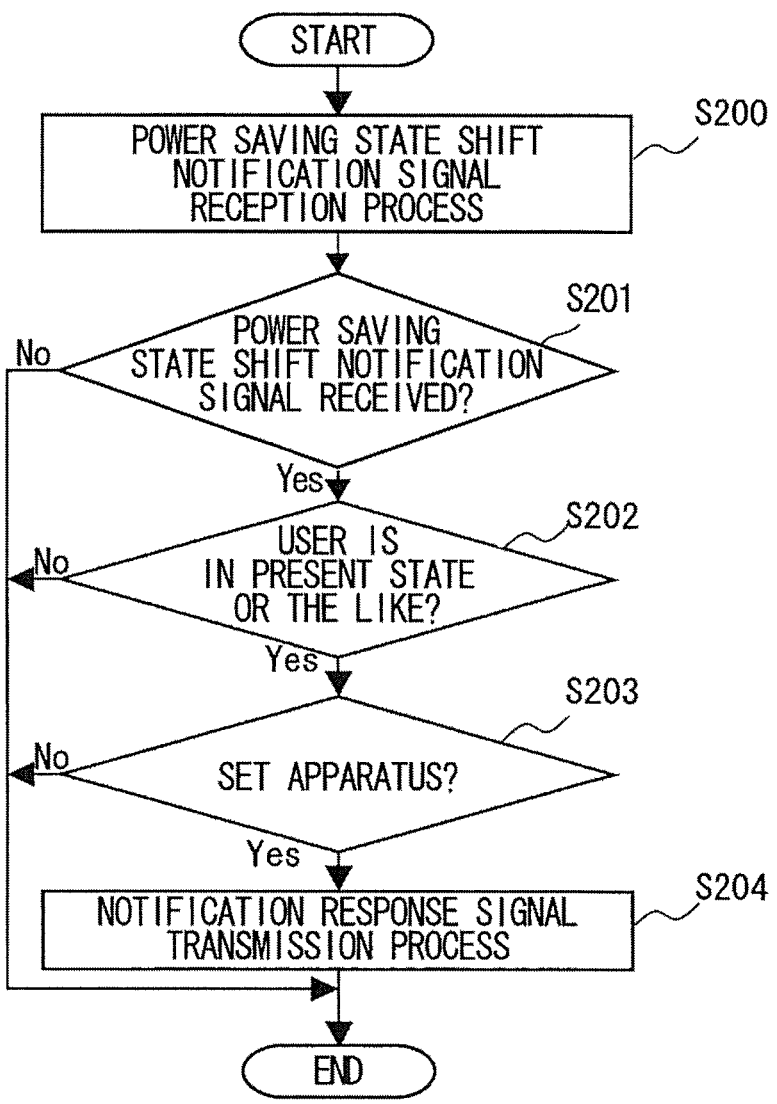
FIG. 4 shows steps of a power saving shift notification response process according to the present embodiment.
Figure 5:
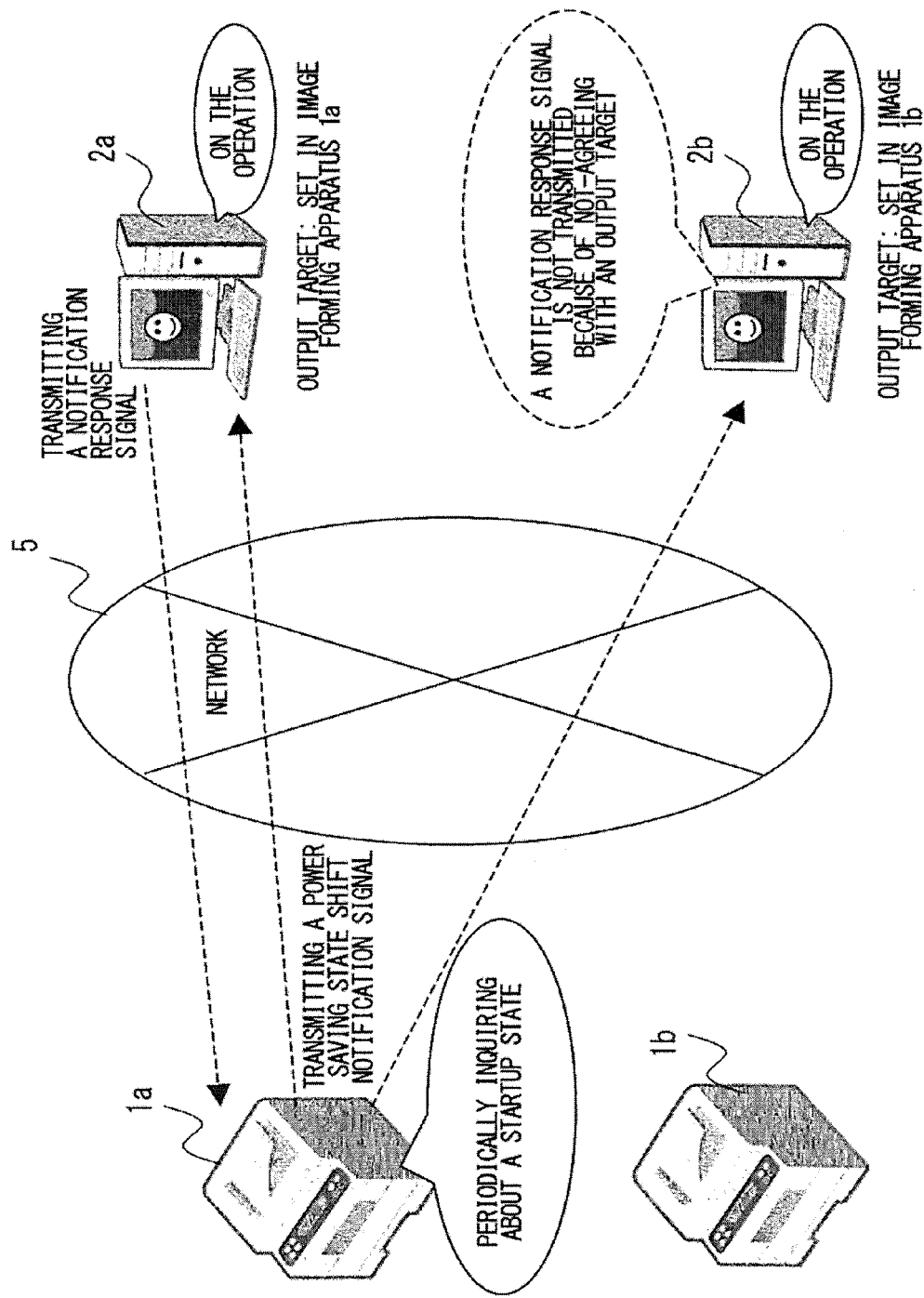
FIG. 5 is a schematic view of the processes shown in FIG. 3 and FIG. 4.
Figure 6:
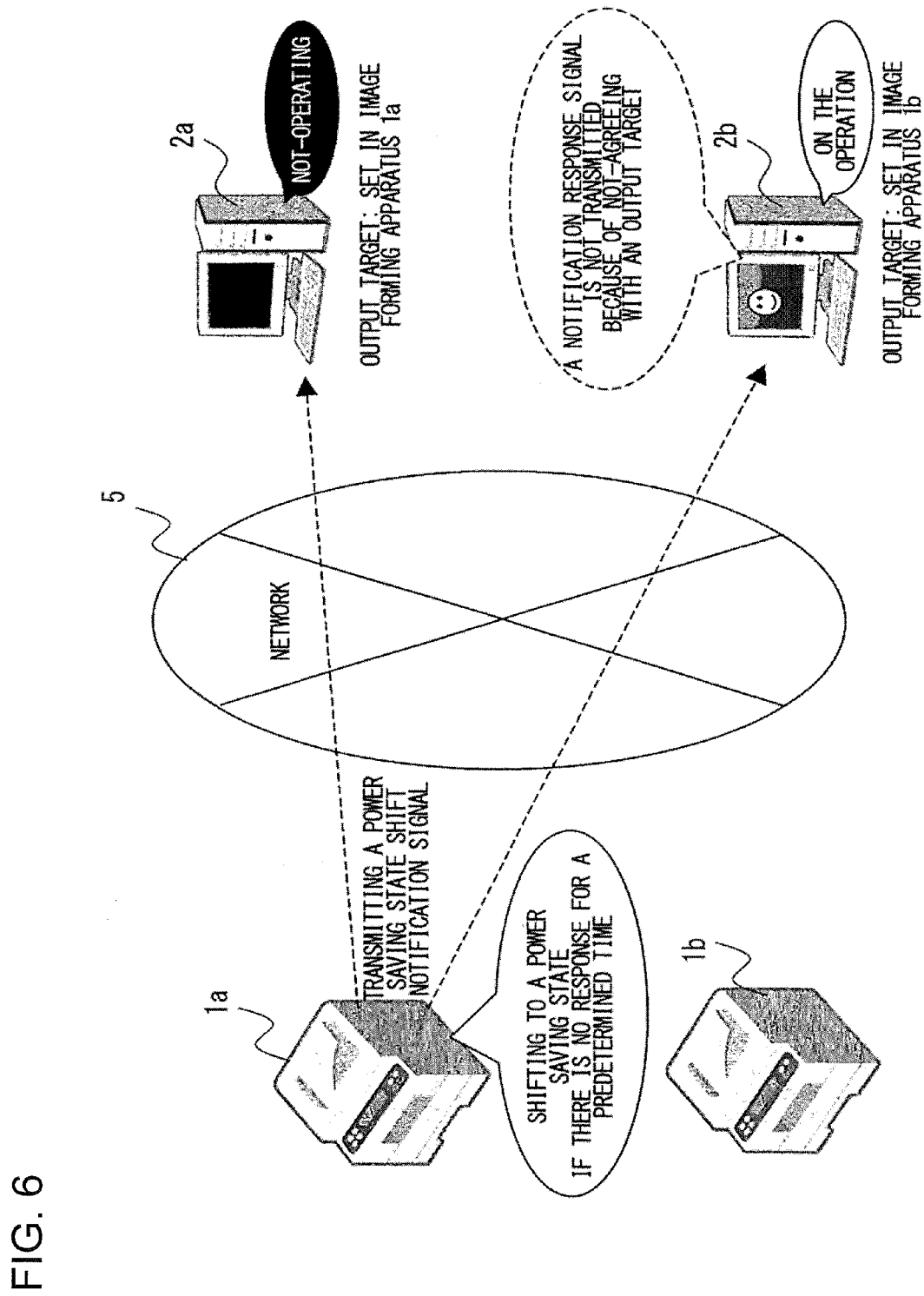
FIG. 6 is a schematic view of the processes shown in FIG. 3 and FIG. 4.

Next, with reference to FIG. 4 to FIG. 6, a power saving shift notification response process by the terminal 2 according to the present embodiment is described. An output target for image forming is set in the terminal 2. Therefore, in the power saving shift notification response process according to the present embodiment, it is determined whether the image forming apparatus 1 is set as an output target or not, and in only a situation of being set, the notification response signal 400 is transmitted to respond. In the power saving shift notification response process according to the present embodiment, mainly the control portion 20 of the terminal 2 shares the program stored in the storage portion 29 with each portion to execute the program by using the hardware resources. Hereinafter, with reference to a flow chart of FIG. 4, details of the power saving shift notification response process are described step by step.

(Step S200)

First, the control portion 20 performs a power saving state shift notification signal reception process by means of the power saving state shift notification signal reception portion 210. The control portion 20 performs a process of receiving the power saving state shift notification signal 300 from the image forming apparatus 1. While operating on the power source, the control portion 20 detects reception of the power saving state shift notification signal 300, which is transmitted from the image forming apparatus 1 via the network 5, by means of the network transmission/reception portion 25.

(Step S201)

Next, the control portion 20 determines by means of the power saving state shift notification signal reception portion 210 whether the power saving state shift notification signal 300 is received or not. In the examples of FIG. 5 and FIG. 6, the control portion 20 determines "Yes" if both a terminal 2a and a terminal 2b receive the power saving state shift notification signal 300 from any one of an image forming apparatus 1a and an image forming apparatus 1b. The control portion 20 determines "No" in a situation other than this, namely, a situation where the power saving state shift notification signal 300 is not received. If "Yes", the control portion 20 advances the process to a step S202. If "No", the control portion 20 ends the power saving shift notification response process.

(Step S202)

Even if the power saving state shift notification signal 300 is received, the control portion 20 determines by means of the notification response signal transmission portion 220 whether or not the user is in a state to be present or the like. For example, the control portion 20 determines "Yes" because of the terminal 2 being in the operation state if the user is operating the terminal 2 by means of an input device or a specific period does not elapse after the user lastly operated the terminal 2, the print data or the like is output, or the auxiliary storage devices such as the HDD, the SSD and the like are not spun off. The control portion 20 determines "No" because of the terminal 2 not-being in the operation state in a situation other than these, for example, a situation where the terminal 2 is in a standby state and can perform background communication only, a situation where the specific period elapses after the user operated the terminal 2 lastly by means of the input device, a situation of being in an "absent" state on messenger software or the like, or a situation where a screen saver is operating or a log-in screen is being displayed. In the example of FIG. 6, the control portion 20 determines "No" because the terminal 2a is not in the operation state. If "Yes", the control portion 20 advances the process to a step S203. If "No", the control portion 20 ends the power saving shift notification response process.

(Step S203)

If the user is in the state to be present and the like, the control portion 20 determines by means of the notification response signal transmission portion 220 whether or not the response is the power saving state shift notification signal 300 is from a set apparatus. The control portion 20 compares the apparatus identification information 301 of the received power saving state shift notification signal 300 and the apparatus identification information 301 of the image forming output setting information 410 with each other and determines "Yes" if it is a response from the image forming apparatus 1 that is set as an output target for image forming and the like. The control portion 20 determines "No" in a situation other than this. In the examples of FIG. 5 and FIG. 6, the terminal 2a is in the operation state in the example of FIG. 5 as described above and the image forming apparatus 1a is set as an output target for image forming and the like; accordingly, the control portion determines "Yes". On the other hand, as to the terminal 2b, in both examples of FIG. 5 and FIG. 6, the image forming apparatus 1a is not set as an output for image forming; accordingly, the control portion determines "No". If "Yes", the control portion 20 advances the process to a step S204. If "No", the control portion 20 ends the power saving shift notification response process.

(Step S204)

If the power saving state shift notification signal 300 is from the set apparatus, the control portion 20 performs a notification response signal transmission process by means of the notification response signal transmission portion 220. The terminal 2 transmits the notification response signal 400 to the image forming apparatus 1 that corresponds to the apparatus identification information 301 contained in the power saving state shift notification signal 300. In the examples of FIG. 5 and FIG. 6, both the terminals 2a and 2b receive the power saving state shift notification signal 300 from the image forming apparatus 1a, of which in the example of FIG. 5, only the terminal 2a, which is operating as described above and whose corresponding image forming apparatus 1a is set as an output target for image forming, transmits the notification response signal 400. Besides, in the example of FIG. 6, the terminal 2a, which is not operating, does not transmit the notification response signal 400. Besides, as in the examples of FIG. 5 and FIG. 6, the terminal 2b, which is not set as an output target for image forming and the like, does not transmit the notification response signal 400. In the meantime, as in the example of FIG. 6, if the terminal 2a is not in the operation state and the power source of the terminal 2 is in a turned-off state or a suspended state, it goes without saying that the terminals 2, 2a do not transmit the notification response signal 400. With this the power saving shift notification response process is ended.

According to the above structure, it is possible to obtain the following effects. The image forming apparatus 1 is characterized to be connectable to the terminal 2 via the network 5, and to include: the power saving state shift notification signal transmission portion 110 that transmits the power saving state shift notification signal 300 to the terminal 2 at the time of shifting to the power saving state; the notification response signal reception portion 120 that receives the notification response signal 400 from the terminal 2 that is set as an output target for image forming and responds, only while in the operation state, to the power saving state shift notification signal 300 transmitted from the power saving state shift notification signal transmission portion 110; and the power saving state shift control portion 130 that stops the shift to the power saving state when receiving the notification response signal 400 by means of the notification response signal reception portion 120 and executes the shift to the power saving state when not-receiving the notification response signal 400.

According to such a structure, it becomes possible to make the terminal 2 shift to the power saving state without registering or supervising the terminal 2 that is a monitoring target. Besides, even when the terminal 2 is not in the operation state, it becomes easy to shift to the power saving state. Besides, it is not necessary to store information of the terminal 2, which is registered or supervised when shifting to the power saving state, into the image forming apparatus 1; accordingly, it is possible to reduce the cost of the storage device.

Besides, the image forming apparatus 1 according to the present embodiment executes the shift to the power saving state when not-receiving the notification response signal 400. Therefore the image forming apparatus 1 can shift to the power saving state even if trouble occurs in the terminal 2.

Besides, the image forming apparatus 1 according to the present embodiment is characterized to include the storage portion 19 that stores the power saving setting information 310 that contains the setting for the shift to the power saving state, wherein in the state set in the apparatus identification information 301 stored in the storage portion 19 is obtained, the power saving state shift control portion 130 shifts to the power saving state even when receiving the notification response signal 400. According to such a structure, even when the operating terminal 2 continues to be present, it is possible to shift to the power saving state if the state set in the power saving setting information 310 is obtained. Therefore it is possible to surely shift to the power saving state under the set condition. Accordingly, it is possible to curb the power consumption and reduce the cost.

Besides, the terminal 2 according to the present embodiment is characterized to be connectable to the image forming apparatus 1 via the network 5, and to include: the power saving state shift notification signal reception portion 210 that receives the power saving state shift notification signal 300 that is transmitted at the time of shifting of the image forming apparatus to the power saving state; and the notification response signal transmission portion 220 that transmits the notification response signal 400 to respond to the image forming apparatus only when the power saving state shift notification signal 300 received by the power saving state shift notification signal reception portion 210 is transmitted from the image forming apparatus that is set as an output target for image forming. According to such a structure, the terminal 2 transmits the notification response signal 400 to the image forming apparatus 1 that is set as an output target for image forming; accordingly, it becomes unnecessary to especially perform the setting and the like for the response to the power saving state, and becomes easy to use. Further, when the terminal 2 is operating, the image forming apparatus 1 is not easily shifted to the power saving state and it becomes possible to quickly use the image forming apparatus 1. Therefore convenience for the user increases.

Besides, the image forming system X according to the present embodiment is characterized to include the image forming apparatus 1 and the terminal 2. According to such a structure, by using the image forming apparatus 1 and the terminal 2, it is possible to provide the image forming system X that has high power saving, and it is possible to reduce the cost.

In the meantime, the present disclosure is also applicable to an information processing apparatus other than the image forming apparatus. In other words, the present disclosure is also applicable to a structure that uses a server or the like to which a network scanner or a scanner is additionally connected by means of a USB or the like.

Besides, the structures and operations of the above embodiments are mere examples, and it goes without saying that it is possible to suitably perform various modifications and put them into practical use. For example, as the peripheral apparatus according to the present disclosure, besides the image forming apparatus, a peripheral apparatus may be employed which operates based on a request from a terminal connected via a network and provides specific service.

As described above, according to the present disclosure, it is possible to provide a peripheral apparatus that can shift to a power saving state without registering a monitoring-target PC beforehand in the peripheral apparatus by executing a shift to the power saving state when not-receiving a notification response signal from a terminal such as a PC and the like that respond only while in an operation state.

What is claimed is:

1. A terminal connectable to a peripheral apparatus via a network, wherein:
   the peripheral apparatus includes:
      a power saving state shift notification signal transmission unit that transmits a power saving state shift notification signal to the terminal at a time of shifting to a power saving state,
      a notification response signal reception unit that receives a notification response signal from the terminal that is set as an output target for image forming and responds, only while in an operation state, to the power saving state shift notification signal transmitted from the power saving state shift notification signal transmission unit, and
      a power saving state shift control unit that stops a shift to the power saving state in a case of receiving the notification response signal by means of the notification response signal reception unit and executes the shift to the power saving state in a case of not-receiving the notification response signal, and
   the terminal includes:
      a power saving state shift notification signal reception unit that receives the power saving state shift notification signal that is transmitted at a time of shifting of the peripheral apparatus to the power saving state, and
      a notification response signal transmission unit that, when the power saving state shift notification signal reception unit receives the power saving state shift notification signal, determines whether or not a user is in a state to be present so that, when the user is in the state to be present, the notification response signal transmission unit transmits the notification response signal to respond to the peripheral apparatus only when the power saving state shift notification signal received by the power saving state shift notification signal reception unit is transmitted from the peripheral apparatus that is set as an output target for image forming and, when the user is not in the state to be present, the notification response signal transmission unit does not transmit the notification response signal.

2. The terminal according to claim 1, comprising:
a storage portion that stores the power saving state shift notification signal, the notification response signal, and image forming output setting information, and
a control portion that compares apparatus identification information of the received power saving state shift notification signal and apparatus identification information of the image forming output setting information with each other, thereby determining whether or not the power saving state shift notification signal is transmitted from the peripheral apparatus that is set as the output target for image forming.

3. The terminal according to claim 1, wherein
the notification response signal transmission unit
determines that the user is in the state to be present when the user is operating the terminal or a specific period has not elapsed after the user operated the terminal last time, and
determines that the user is not in the state to be present when the specific period has elapsed after the user operated the terminal last time.

4. The terminal according to claim 1, wherein
the terminal includes a storage portion including an auxiliary storage device, and when the auxiliary storage device has not spun off, the user is determined to be in the state to be present.

5. The terminal according to claim 1, wherein
the notification response signal transmission unit determines that the user is not in the state to be present when the terminal can perform background communication only.

6. The terminal according to claim 1, wherein
the notification response signal transmission unit determines that the user is not in the state to be present when messenger software recognizes an absent state.

7. A power saving control system that includes a peripheral apparatus and a terminal connectable to the peripheral apparatus via a network, wherein
the peripheral apparatus includes:
a power saving state shift notification signal transmission unit that transmits a power saving state shift notification signal to the terminal at a time of shifting to a power saving state,
a notification response signal reception unit that receives a notification response signal from the terminal that is set as an output target for image forming and responds, only while in an operation state, to the power saving state shift notification signal transmitted from the power saving state shift notification signal transmission unit, and
a power saving state shift control unit that stops a shift to the power saving state in a case of receiving the notification response signal by means of the notification response signal reception unit and executes the shift to the power saving state in a case of not-receiving the notification response signal, and
the terminal includes:
a power saving state shift notification signal reception unit that receives the power saving state shift notification signal that is transmitted from the power saving state shift response signal transmission unit of the peripheral apparatus, and
a notification response signal transmission unit that, when the power saving state shift notification signal reception unit receives the power saving state shift notification signal, determines whether or not a user is in a state to be present so that, when the user is in the state to be present, the notification response signal transmission unit transmits the notification response signal to respond to the peripheral apparatus only when the power saving state shift notification signal received by the power saving state shift notification signal reception unit is transmitted from the peripheral apparatus that is set as the output target for image forming and, when the user is not in the state to be present, the notification response signal transmission unit does not transmit the notification response signal.

8. The power saving control system according to claim 7, wherein
the notification response signal transmission unit
determines that the user is in the state to be present when the user is operating the terminal or a specific period has not elapsed after the user operated the terminal last time, and
determines that the user is not in the state to be present when the specific period has elapsed after the user operated the terminal last time.

9. The power saving control system according to claim 7, wherein
the terminal includes a storage portion including an auxiliary storage device, and when the auxiliary storage device has not spun off, the user is determined to be in the state to be present.

10. The power saving control system according to claim 7, wherein
the notification response signal transmission unit determines that the user is not in the state to be present when the terminal can perform background communication only.

11. The power saving control system according to claim 7, wherein
the notification response signal transmission unit determines that the user is not in the state to be present when messenger software recognizes an absent state.

12. A non-transitory computer-readable recording medium that stores a power saving control program executed by a computer of a terminal connectable a the peripheral apparatus via a network, non-temporary, and computer-readable, wherein
the peripheral apparatus includes:
a power saving state shift notification signal transmission unit that transmits a power saving state shift notification signal to the terminal at a time of shifting to a power saving state,
a notification response signal reception unit that receives a notification response signal from the terminal that is set as an output target for image forming and responds, only while in an operation state, to the power saving state shift notification signal transmitted from the power saving state shift notification signal transmission unit, and a power saving state shift control unit that stops a shift to the power saving state in a case of receiving the notification response signal by means of the notification response signal reception unit and executes the shift to the power saving state in a case of not-receiving the notification response signal, the terminal includes:

a power saving state shift notification signal reception unit that receives the power saving state shift notification signal that is transmitted at a time of shifting of the peripheral apparatus to the power saving state, and a notification response signal transmission unit that, when the power saving state shift notification signal reception unit receives the power saving state shift notification signal, determines whether or not a user is in a state to be present so that, when the user is in the state to be present, the notification response signal transmission unit transmits the notification response signal to respond to the peripheral apparatus only when the power saving state shift notification signal received by the power saving state shift notification signal reception unit is transmitted from the peripheral apparatus that is set as the output target for image forming and, when the user is not in the state to be present, the notification response signal transmission unit does not transmit the notification response signal, and the power saving control program includes:

a first program code that makes the computer receive the power saving state shift notification signal that is transmitted at a time of shifting of the peripheral apparatus to the power saving state, and a second program code that makes the computer transmit the notification response signal to respond to the peripheral apparatus only when the received power saving state shift notification signal is transmitted from the peripheral apparatus that is set as the output target for image forming.

13. The recording medium according to claim 12, wherein the notification response signal transmission unit determines that the user is in the state to be present when the user is operating the terminal or a specific period has not elapsed after the user operated the terminal last time, and determines that the user is not in the state to be present when the specific period has elapsed after the user operated the terminal last time.

14. The recording medium according to claim 12, wherein the terminal includes a storage portion including an auxiliary storage device, and when the auxiliary storage device has not spun off, the user is determined to be in the state to be present.

15. The recording medium according to claim 12, wherein the notification response signal transmission unit determines that the user is not in the state to be present when the terminal can perform background communication only.

16. The recording medium according to claim 12, wherein the notification response signal transmission unit determines that the user is not in the state to be present when messenger software recognizes an absent state.

* * * * *